(No Model.) 3 Sheets—Sheet 1.
J. G. ALEXANDER.
HORSE HAY RAKE.
No. 358,102. Patented Feb. 22, 1887.
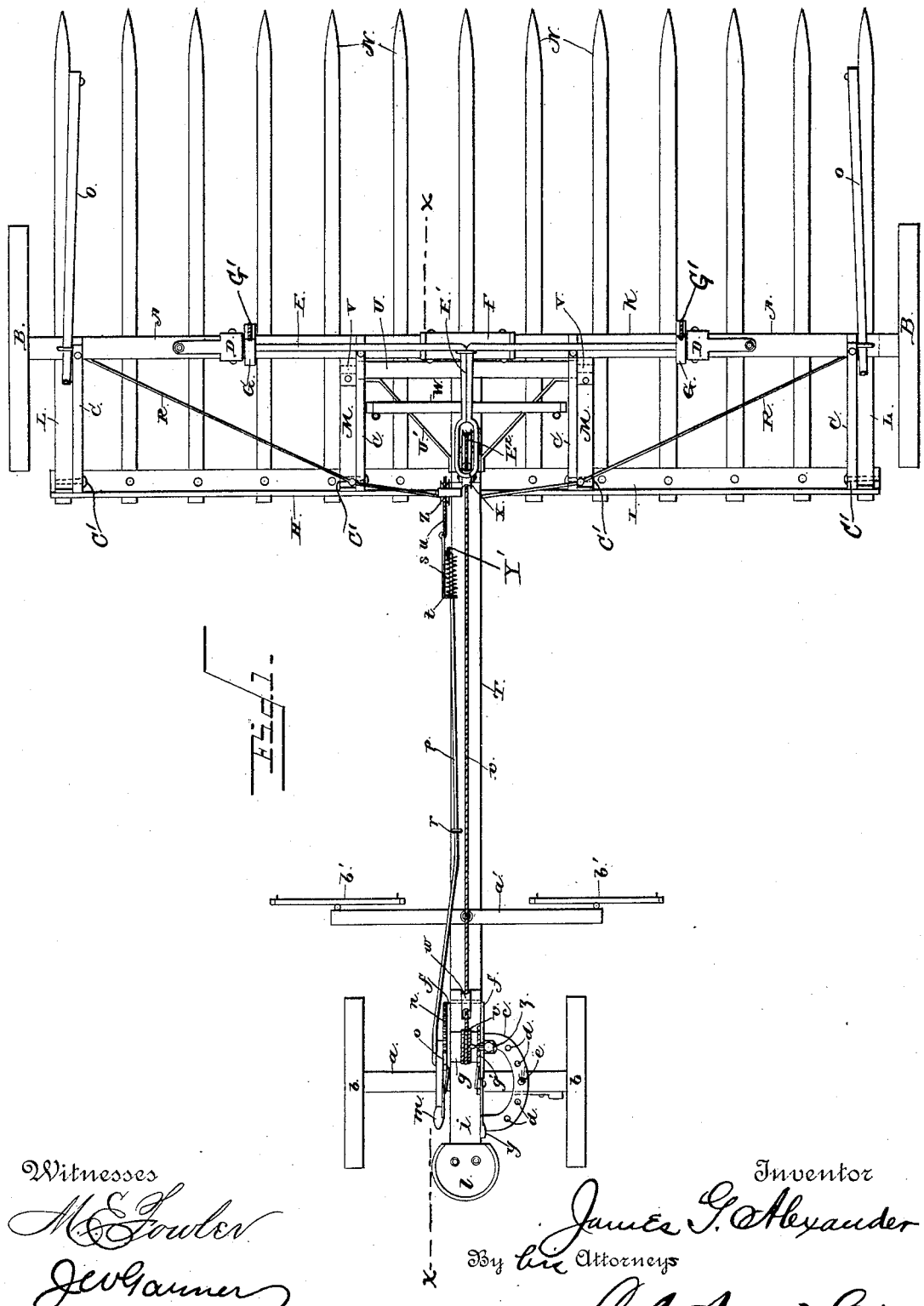

(No Model.) 3 Sheets—Sheet 2.
J. G. ALEXANDER.
HORSE HAY RAKE.
No. 358,102. Patented Feb. 22, 1887.
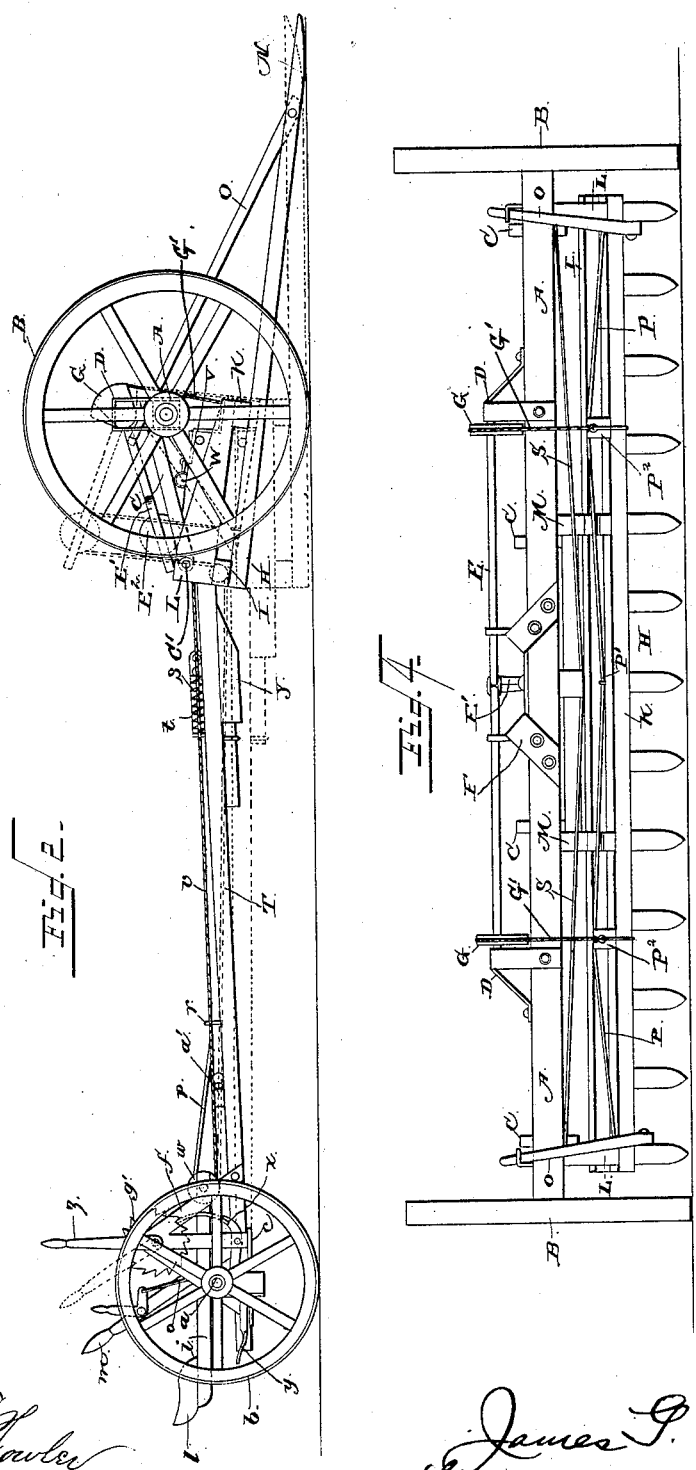
Witnesses
M. E. Fowler
J. W. Garner
Inventor
James G. Alexander
By his Attorneys
C. A. Snow & Co.

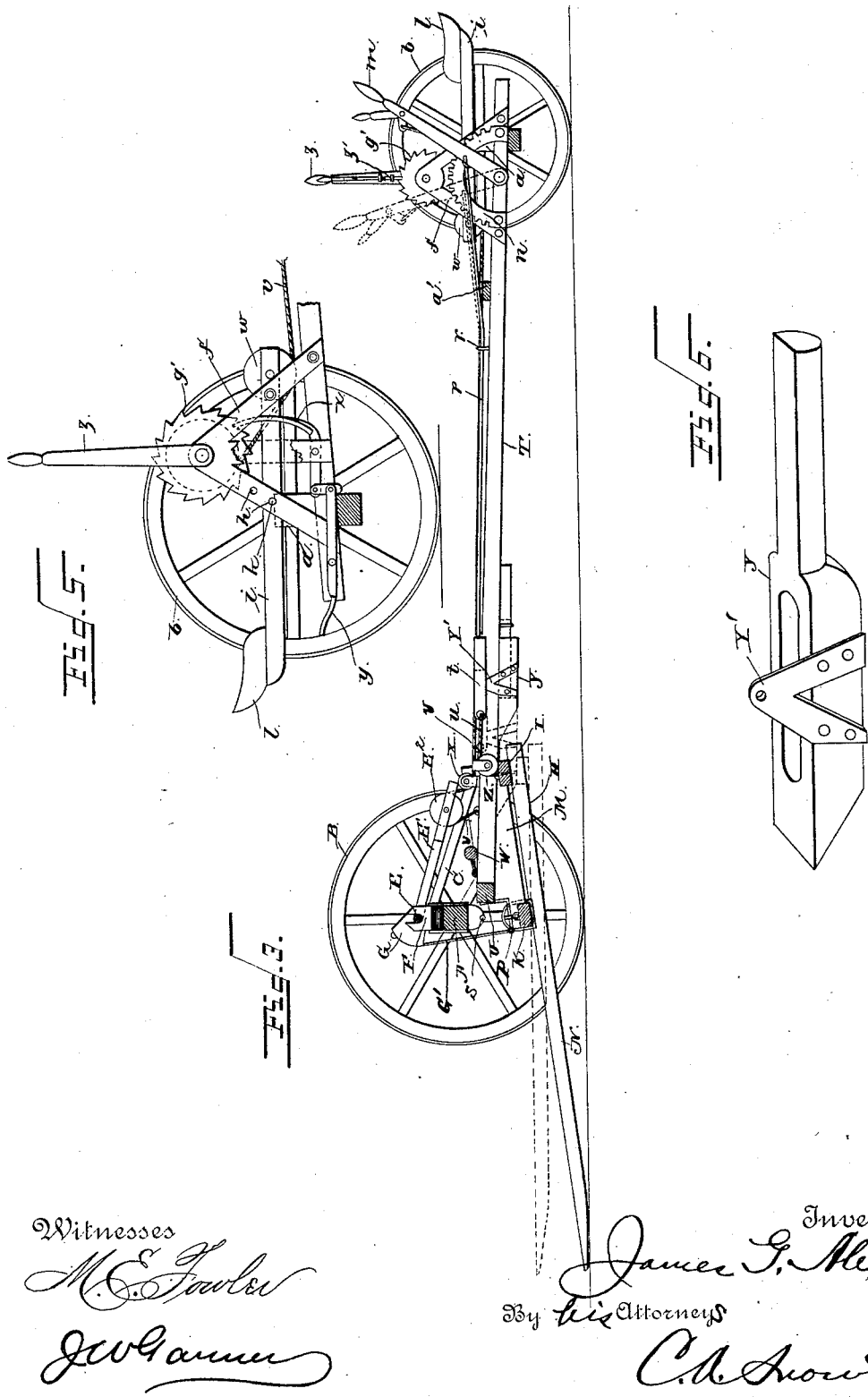

UNITED STATES PATENT OFFICE.

JAMES GREEN ALEXANDER, OF ILIA, MISSOURI, ASSIGNOR OF ONE-HALF TO W. E. BRACEWELL, OF LINEVILLE, IOWA.

HORSE HAY-RAKE.

SPECIFICATION forming part of Letters Patent No. 358,102, dated February 22, 1887.

Application filed May 19, 1886. Serial No. 202,671. (No model.)

*To all whom it may concern:*

Be it known that I, JAMES GREEN ALEXANDER, a citizen of the United States, residing at Ilia, in the county of Mercer and State of Missouri, have invented a new and useful Improvement in Horse Hay-Rakes, of which the following is a specification.

My invention relates to an improvement in horse hay-rakes; and it consists in the peculiar construction and combination of devices, that will be more fully set forth hereinafter, and particularly pointed out in the claims.

In the drawings, Figure 1 is a top plan view of a horse hay-rake embodying my improvements. Fig. 2 is a side elevation of the same. Fig. 3 is a vertical longitudinal section taken on the line $x\ x$ of Fig. 1. Fig. 4 is a front elevation of my improved rake. Fig. 5 is a detailed side elevation of the rear portion of the machine, partly in section. Fig. 6 is a detailed perspective view of the block Y.

A represents the axle, to the ends of which are attached the supporting-wheels B. From the rear side of the axle project a number of downwardly-inclined arms, C, which are rigidly bolted or otherwise secured thereto, and on the upper side of said axle, at a suitable distance from the center, on each side, are secured brackets D, in which are journaled the ends of a rock-shaft, E. The said rock-shaft is provided at its center with a rearward-extending arm, E', in which is journaled a sheave, E². A bracket, F, is secured on the upper side of the axle A, at the center thereof, and supports the central portion of the rock-shaft E. The said shaft is provided at its ends with segmental arms G, which are attached rigidly to the shaft and project forwardly therefrom, and are adapted to rock when the shaft is turned. To the said arms G are attached supporting depending chains or ropes G', the lower ends of which are attached to the rake-head, hereinafter described, whereby, when the shaft E is turned so as to raise the arms G, the latter, through the ropes or chains G', raise the front end of the rake-head.

H represents the rake-head, which comprises the transverse parallel bars I and K, the connecting-beams L at the ends of the said bars, the connecting-beams M near the centers of the bars, on their upper sides, and the forks N, which are secured under the bars I and K and project forwardly therefrom for a considerable distance. The front ends of the forks are pointed and sharpened, as shown, and to the outer forks at the sides of the rake-head are pivoted arms O, the rear ends of which rest upon the axle A near the ends thereof. These arms O form sides for the rake, their function being to confine the hay which is gathered by the rake and prevent it from slipping laterally from the rake, and the said arms are pivoted at their lower ends to the outer forks and have their upper ends free to move on the axle, in order that they may offer no obstacle to the free raising and lowering of the rake-head. The rear ends of the arms C, which project from the axle A, are pivoted to the beams L and M of the rake-head, and thereby the latter is pivoted to the axle, as will be readily understood.

In order to strengthen the rake-head and prevent it from sagging at its center when loaded, I provide a brace-rod, P, which is trussed on the upper side of the bar K. The central portion of the rod P is attached to the center of the bar K by a keeper or bolt, P', and blocks P² are inserted between the bar and the rod, midway between the centers and the ends thereof, thus tightening the rod on the upper side of the bar and securely bracing the latter. From the ends of the said bar extends a similar truss-rod, R, which passes over the rear ends of the beams M and down under the rear projecting end of the central rake fork or finger. The axle is also provided on its under side with a truss-rod, S.

T represents a pushing-pole, which is provided at its front end with a transverse bar, U, the ends of which are pivoted in boxes V, secured on the front end of the beams M. The said transverse bar U is braced on the front end of the pushing-pole by means of diagonal brace-bars U'. To the front end of the pushing-pole, on its upper side, is attached a neck-yoke, $w$, to which the holdback-straps of the team are to be attached, and in rear of the said neck-yoke, on the pushing-pole, is journaled a sheave, X. On the under side of the pushing-pole, near the front end thereof, is secured a longitudinally-sliding block, Y, the front end of which is beveled on its under side, and thereby adapted to enter between the bar I of the rake-head and the under side of the pushing-pole. To the latter, immediately in rear of the sheave X and on one side of the same, is journaled a sheave, Z.

$a$ represents a short rear axle, which is pivoted at its center to the under side of the pushing-pole, near the rear end of the latter. This axle is provided with supporting-wheels $b$, and from one side of the pushing-pole projects a semicircular plate, $c$, provided with a series of openings, $d$. A detent catch or pin, $e$, projects from the upper side of the axle $a$, near one end thereof, and engages one of the openings $d$, thereby locking the axle rigidly to the pushing-pole, and permitting the said axle to be held at any desired angle with relation to the said pushing-pole.

Secured near the rear end of the pushing-pole, and projecting from the upper side thereof, are a pair of brackets or standards, $f$, in between the upper ends of which is journaled a drum, $g$. The rear sides of the standard-brackets $f$ are provided with vertical series of openings $h$.

$i$ represents a seat-bar, the front end of which is pivoted between the front side of the standard-brackets $f$, and which is supported at any suitable elevation by a transverse pin, $k$, which passes through two of the openings $h$ and bears under the seat-bar $i$ near the rear end of the latter. To the rear end of the said seat-bar is attached the seat $l$.

$m$ represents a hand-lever, the lower end of which is pivoted to the pushing-pole just in advance of the axle $a$. This hand-lever may be locked at any desired angle to a serrated segment-plate, $n$, by means of the usual spring-actuated or gravity locking-bolt $o$, with which the hand-lever is provided.

$p$ represents a rod, which is guided in keepers $r$ on the pushing-pole. The rear end of the said rod is attached to the hand-lever $m$, and the front end of the same is connected to an arm, Y′, that projects upwardly from one side of the sliding block Y. A coiled extensile spring, $s$, is placed on the front end of the said rod, and to the same is attached a sliding link, $t$, which bears against the rear end of the said spring. To the front end of the link is attached an elevating-rope, $u$, which passes over the sheave Z, and has its lower front end attached to the bar I, which forms the rear side of the rake-head.

To the drum $g$ is attached a rope, $v$, which passes down under a sheave, $w$, which is journaled in the front end of the seat-bar $i$, and from thence said rope extends forwardly on the upper side of the pushing-pole, under the sheave X, over the sheave E², and the front end of the said rope is attached near the front end of the pushing-pole.

The drum $g$ is provided on one side with ratchet-teeth $g'$, and a detent, $x$, which is pivoted to one of the standard-brackets $f$ just below the drum, engages with the said ratchet-teeth. A foot-lever, $y$, is pivoted in rear of the detent $x$, and is connected to the latter, as shown. The function of this detent is to prevent the rope $v$ from unwinding from the drum $g$ when the detent is in engagement with the teeth of the said drum.

$z$ represents an operating-lever, which is pivoted to the projecting end of the shaft on which the drum rotates, and the said lever is provided with a spring-actuated locking-bolt, $z'$, which engages one of the ratchet-teeth $g'$.

$a'$ represents a double-tree, which is pivoted to the pushing-pole near the rear end of the latter, and to the outer end of the said double-tree are attached the usual single-trees, $b'$, to which the draft-animals are harnessed.

The operation of my invention is as follows: The front end of the pushing-pole is sustained at a suitable height above the ground by having the neck-yoke attached to the harness of the team, as before described, and when the block Y is moved forward to its full extent the rake is supported in a horizontal position above the ground, as shown in dotted lines in Fig. 3. In order to raise the rake from the ground, the driver presses one foot upon the lever $y$, and thereby disengages the detent $x$ from the ratchet-teeth of the drum $g$. He then grasps the lever $z$ and permits the said drum to rotate sufficiently to uncoil the rope $v$, which, being connected to the arm E′ by passing over the pulley E² in the said arm, allows the weight of the rake to pull downwardly upon the arms G through the ropes G′, which connect the rake to the said arms, and partly rotates the rock-shaft E, so as to raise the arm E′. This causes the rake to turn on the pivotal bolts $c'$, which connect its rear end to the rear ends of the arms $c$, and causes the points of the rake-teeth to be lowered toward the ground. The driver then releases the lever $m$ from the segment rack-plate $n$ and moves the said lever rearwardly, thus drawing back upon the rod $p$ and the sliding block Y, and moving the latter from between the bar I and the under side of the pushing-pole. The rope $u$, which connects the rear end of the rake-head with the rod $p$, then becomes tightened and draws upwardly on the rear end of the rake-head, thus turning the latter on the ends of the bar U, to which it is pivoted, and thereby inclining the rake-teeth until their points touch the ground. As the machine advances, the hay is raked upon the rake-teeth until the latter become loaded. The function of the spring $s$, which is connected to the front end of the rod $p$, is to permit the teeth of the rake-head to adjust themselves vertically to any inequalities of the ground, thus preventing the points of the teeth from sticking in the ground and stopping or breaking the machine. When a sufficient quantity of hay has been gathered upon the rake-teeth, the driver, by the means hereinbefore described, raises the rake-teeth to a horizontal position above the ground. He then directs the team toward the stack, and steers the machine by placing his feet on the pivoted axle a and disengaging the same from the locking segment-plate c. When the stack is reached, the points of the teeth are lowered to the ground and the team is backed, thereby causing the hay to become dislodged therefrom and deposited at the foot of the stack.

A horse hay-rake thus constructed is adapted to be used upon soft and wet ground, as well as upon hard and dry ground, is easily operated, is cheap and simple, and is not likely to get out of order.

Having thus described my invention, I claim—

1. The combination, in a horse hay-rake, of the front axle having the supporting-wheels and the rearward-extending arms C, the rake-head pivoted to the rear ends of the said arms, the rock-shaft E on the axle, and having the elevating-arms G attached to the rake-head, the pushing-pole having its front end pivoted to the rake-head, means for rotating the rock-shaft, and thereby raising the front side of the rake-head, and means for elevating the rear side of the rake-head, substantially as described.

2. The combination, in a horse hay-rake, of the axle A, having the supporting-wheels and the rearward-extending arms C, the rake-head having its rear side pivoted to the rear ends of the said arms, means for raising and lowering the front side of the rake-head, the pushing-pole pivoted to the front side of the rake-head, means for raising and lowering the rear side of the rake-head, and the sliding block Y on the under side of the pushing-pole, adapted to move forward between the said pushing-pole and the rear side of the rake-head to support the latter in a horizontal raised position, substantially as described.

3. The combination of the rake-head, the pushing-pole pivoted to the front side thereof, the supporting-axle A, having the rearward-projecting arms C, to which the rear side of the rake-head is connected, means for raising and lowering the front side of the rake-head, and the elevating-rope u, for raising and lowering the rear side of the rake-head and attached to the spring s, whereby the points of the rake-teeth may yield to the inequalities of the ground, for the purpose set forth, substantially as described.

4. The combination of the supporting-axle A, having the rearward-extending arms C, the rake-head having its rear side pivoted or connected to the rear ends of the said arms, means for raising or lowering the front side of the rake-head, the pushing-pole pivoted to the front side of the rake-head, the sliding block Y on the under side of the pushing-pole, the rod r, attached to the said block, the spring s on the said rod, the link bearing against the said spring, and the elevating-rope u, attached to the said link and to the rear end of the rake-head, for the purpose set forth, substantially as described.

5. The combination of the supporting-axle A, having the supporting-wheels and the arms C, the rock-shaft E on the said axle, and having the rearward-extending arm E' and the arms G connected to the front sides of the rake-head, the pushing-pole having its front end pivoted to the front side of the rake-head, means for raising and lowering the rear side of the rake-head, and the rope v, connected to the arm E' and passing under the sheave X on the pushing-pole, for raising or lowering the arm E', and thereby partly rotating the rock-shaft to raise or lower the front side of the rake-head, substantially as described.

6. In a horse hay-rake, the axle and carrying-wheels, in combination with the inclined arms C and the rake-head arranged below the axle and pivoted at its rear to the arms C, as specified.

7. In a horse hay-rake, the axle and carrying-wheels, in combination with the inclined arms C, secured to the axle, the rake-head arranged below the axle and pivoted at its rear to the arms C, and the arms O, pivoted to the rake-teeth in front of the axle and loosely connected to the axle, as set forth.

8. In a horse hay-rake, the combination, with the axle, of the rake-head arranged below the same and pivoted thereto, and the arms O, pivoted to the rake-teeth and loosely connected to the axle, as set forth.

9. In a horse hay-rake, the rake-head having the straight transverse truss-rod P and the truss-rod R, extending from the ends of the rod P rearwardly under the center of the rake-head, as set forth.

10. In a horse hay-rake, the rake-head having the rake-teeth and the cross-bars K and I, and the truss-rod R, having its central portion secured under the rear side of the rear bar, I, the extremities of the said rod being passed over the bar I and connected to the under side of the bar K near the ends thereof, substantially as described.

11. In a horse hay-rake, the rake-head, in combination with the pushing-pole pivoted in advance of the rear end of the rake-head and a sliding block, Y, to be pushed between the pushing-pole and the rear end of the rake-head to raise the front end of the latter, as set forth.

12. In a horse hay-rake, the rake-head, in combination with the pushing-pole pivoted in advance of the rear end of said head, locking means, such as sliding block Y, interposed between the rear end of the rake-head and the pushing-pole to raise the front end of the rake-head, and the elevating cords or chains G', attached to the front portion of the rake-head, and the levers to which the said cords are connected to draw upon the same, and thereby further raise the front end of the rake-head, substantially as described.

In testimony that I claim the foregoing as my own I have hereto affixed my signature in presence of two witnesses.

JAMES GREEN ALEXANDER.

Witnesses:
J. T. SULLIVAN,
S. G. BUSBY.